(12) United States Patent
Rebsdorf

(10) Patent No.: US 6,619,918 B1
(45) Date of Patent: Sep. 16, 2003

(54) METHOD OF CONTROLLING THE OPERATION OF A WIND TURBINE AND WIND TURBINE FOR USE IN SAID METHOD

(75) Inventor: Anders Varming Rebsdorf, Lemvig (DK)

(73) Assignee: Vestas Wind Systems A/S, Lem (DK)

( * ) Notice: Subject to any disclaimer, the term of this patent is extended or adjusted under 35 U.S.C. 154(b) by 0 days.

(21) Appl. No.: 10/111,921

(22) PCT Filed: Nov. 3, 1999

(86) PCT No.: PCT/DK99/00595

§ 371 (c)(1),
(2), (4) Date: May 1, 2002

(87) PCT Pub. No.: WO01/33075

PCT Pub. Date: May 10, 2001

(51) Int. Cl.[7] .................................................. F03D 7/04
(52) U.S. Cl. ................................ 416/1; 416/31; 416/37
(58) Field of Search ................................ 416/1, 31, 37, 416/43, 47, 48, 61

(56) References Cited

U.S. PATENT DOCUMENTS

| | | | |
|---|---|---|---|
| 4,193,005 A | * | 3/1980 | Kos et al. ...................... 416/37 |
| 4,297,076 A | * | 10/1981 | Donham et al. |
| 4,372,157 A | * | 2/1983 | Caruthers et al. |
| 4,524,620 A | * | 6/1985 | Wright et al. |
| 6,361,275 B1 | * | 3/2002 | Wobben ...................... 416/31 |

FOREIGN PATENT DOCUMENTS

| | | | |
|---|---|---|---|
| DE | 19731918 A1 | * | 1/1999 |
| DE | 19847982 A1 | * | 6/1999 |
| DK | 9800589 A | * | 10/1999 |
| JP | 07-054762 A | * | 2/1995 |

OTHER PUBLICATIONS

Patent Abstracts of Japan, vol. 1995, No. 05, Jun. 30, 1995.*
International Search Report for PCT/DK99/00595, filed Nov. 3, 1999.*

* cited by examiner

*Primary Examiner*—Christopher Verdier
(74) *Attorney, Agent, or Firm*—Larson & Taylor PLC

(57) ABSTRACT

The wind turbine (1) comprises a rotor (2) with a number of blades mounted for rotation about a mainly horizontal axis, and the pitch of the blades of the wind turbine is controlled dependence on measured parameters to optimize the operation of the wind turbine with respect to produced energy under varying weather and wind conditions. By measuring mechanical loads on the blades (7, 8), and controlling the pitch of the blades of the wind turbine in such a way, that the measured mechanical loads are maintained below certain limits during operation, the control can be performed closer to the mechanical load limits of the blades without risk of exceeding these limits.

9 Claims, 2 Drawing Sheets

METHOD OF CONTROLLING THE OPERATION OF A WIND TURBINE AND WIND TURBINE FOR USE IN SAID METHOD

TECHNICAL FIELD

The present invention relates to a method of controlling the operation of a wind-turbine and a wind turbine for use in said method of the kind set forth hereinafter.

BACKGROUND ART

In wind turbines of this kind, it is known to control the pitch of the blades of the wind turbine in dependence on measured parameters such as wind speed, wind turbulence, i.e. varying wind speed, etc., in order to optimize the operation of the wind turbine with respect to producing as much energy as possible under the varying weather and wind conditions. The conventional procedure for dimensioning the blades of the wind turbines has been to dimension the blade to withstand the mechanical loads which they are subjected to during normal operation, taking necessary safety margins into account. At very high wind speeds, the wind turbines are normally stopped in order to avoid mechanical overload. During such stop periods, the yaw control is still active, keeping the rotor plane perpendicular to the wind direction, but the blades are pitched out of the wind and rotation is stopped. When the wind speed is again reduced below a certain limit, the wind turbine is started again.

From U.S. Pat. No. 4,339,666 it is known to control the pitch of the blades of a wind turbine in such a way, that the safe operation is secured, i.e. controlled to keep maximum loads on rotor, gearbox and generator below the maximum allowable values. This patent describes the use of average wind velocity and turbulence factor as the primary controlling parameters. This has the disadvantage, that variations in wind speed over the surface of the rotor (wind shear) are not taken into account.

From DE 197 31 918 it is further known to control the pitch of the blades of the wind turbine in dependence of measured mechanical loads on the blades by controlling the pitch in such a way that the mechanical loads are maintained below certain limits during operation.

However, none of these documents indicate the possibility of using the measured mechanical loads to deduce information on the positions of the blade tips and using this information to influence the control of the wind turbine in order to maintain a certain safety distance between the blade and tower.

DISCLOSURE OF THE INVENTION

It is the object of the present invention to provide a method of controlling the operation of a wind turbine and a wind turbine for use in said method of the kind referred to above, with which it is possible to perform the controlling of the wind turbine in such a way, that a certain safety distance can be maintained between the blade tips and the tower, and this object is achieved with a method of said kind, which according to the present invention also comprises the features set forth hereinafter, and with a wind turbine of said kind, which according to the present invention also comprises the features set forth hereinafter. With this arrangement, the controlling function in the wind turbine has access to the instantaneous mechanical loads on the blades and can control the wind turbine in such a way that the position of the tips of the blades deduced from the measured mechanical loads is taken into consideration for setting the control parameters, thus making it possible to keep a certain safety distance during operation. Due to the fact that the controller has access to the measured mechanical loads on the blades, the controller can control the wind turbine close to the mechanical load limits of the blades without any risk of exceeding these limits, whereby the control can be optimized with respect to maximizing the energy output to a higher degree than in a situation in which the optimization is limited by the possible, unknown statistical variation of the wind field during operation, which may be highly dependent on weather and wind conditions, and varying from top to bottom position of the blades (wind shear). This control of the wind turbine close to the mechanical load limits is in the following description designated aggressive control.

BRIEF DESCRIPTION OF THE DRAWINGS

In the following detailed part of the present description, the invention will be explained in more detail with reference to the exemplary embodiment of a wind turbine for use in the method in accordance with the invention shown in the drawings, in which.

DESCRIPTION OF THE PREFERRED EMBODIMENT

Figure 1:
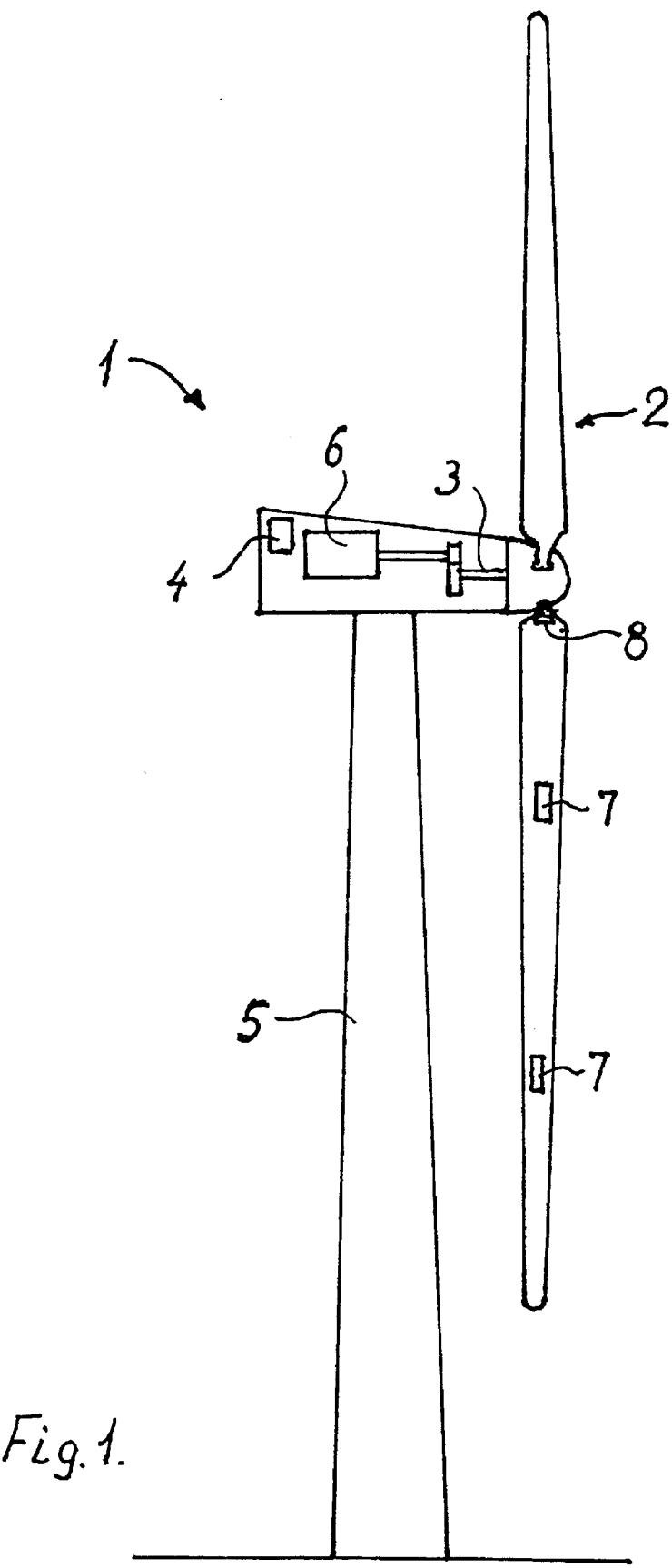
FIG. 1 shows a sketch of a wind turbine comprising mechanical load sensors mounted to measure the mechanical loads on the blades, and FIG. 2 schematically shows different power curves for wind turbines controlled in different ways, and FIG. 3 schematically shows the mechanical load on the blades as a function of wind velocity corresponding to the different power curves shown in FIG. 2.

The wind turbine 1 shown in FIG. 1 comprises a rotor 2 with a number of blades mounted for rotation about a mainly horizontal axis 3 and driving an electric generator 6 all mounted on top of a tower 5. In order to position the plane of the rotor 2 against the wind (yaw control), the top rotates around a vertical axis. The wind turbine is of the kind, in which the rotation of the rotor 2 is controlled by individually controlling the pitch of each of the blades of the rotor, in dependence on measured parameters. A control unit 4 for controlling the pitch of the blades and possibly the position of the rotor relative to the wind direction and other controlling parameters is positioned in a suitable place in the wind turbine 1 to receive information on measured parameters such as wind speed, wind turbulence, power output from the generator 6, wind direction, etc. The control unit 4 is also connected to receive measurements from sensors such as strain-gauges 7, 8 positioned on the blades of the rotor 2, in order to measure mechanical loads on said blades by means of the optical-fibre strain-gauge type sensors 7 and the drive moments from each blade at the root of the blade by means of the optical-fibre strain-gauge 8. The wind turbine may comprise further control units functioning together with the control unit 4 in a multi controller system.

When dimensioning the blades in order to avoid mechanical overload, essentially two possibilities are present, one being dimensioning the blades to be more rigid and the other being to control the wind turbine less aggressively whereby the bending of the blade will be reduced. However, the first possibility will increase the price of the construction and the second possibility will reduce the amount of energy produced, as illustrated in FIG. 2 and explained in the following.

By measuring the mechanical loads on the blades and deducing information on the positions of the blade tips and using this information for controlling the wind turbine, it is possible to control the wind turbine in such a way that a less rigid construction of the blades can be used and a relatively aggressive control of the wind turbine can be used most of the time, as information is present which indicates when to use less aggressive control of the wind turbine. Naturally, the individual measured loads are used for the individual pitch control of each blade.

By means of the measuring of the mechanical loads on the blades, the control can deduct the bending of the blades and thereby the position of the tips of the blades whereby the safety distance between the tower and the tips of the blades can be varied as long as the character of the instant wind is known. A variation of the safety distance can be obtained by using different control algorithms.

Figure 2:
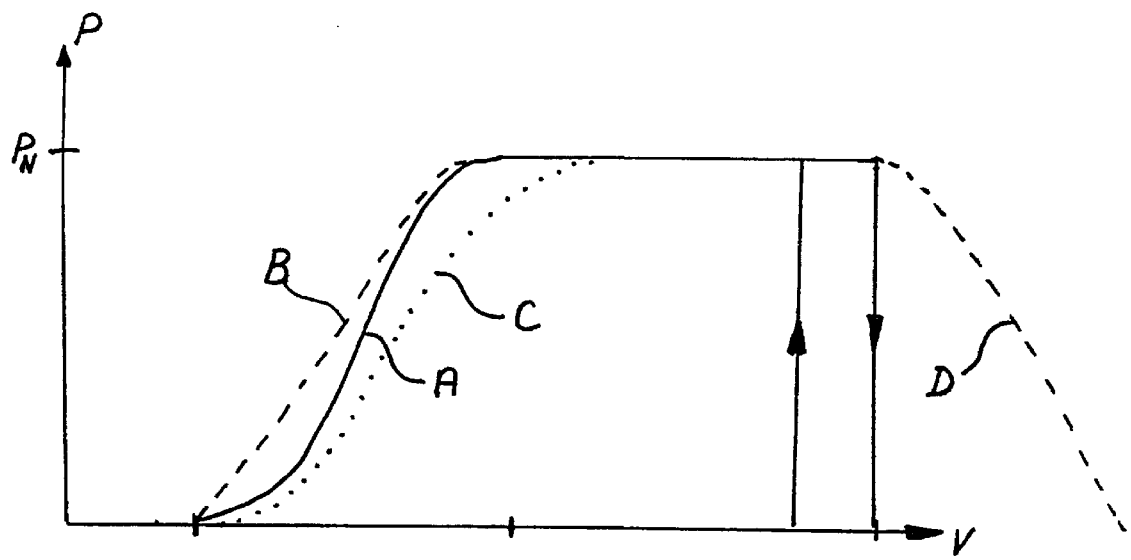

FIG. 2 shows a typical power curve A for a wind turbine which is controlled to optimize the energy production. At low winds, the wind turbine is not producing any energy and at a certain minimum wind velocity, the energy production is started up, and with increasing wind velocity, the energy production is raised until nominal power, $P_N$, is reached. At higher winds, the wind turbine produces energy at the level $P_N$ and the pitch of the blades is controlled to keep a constant power output. At a certain wind velocity (typically 25 m/s), the wind turbine is stopped as previously described, in order to avoid mechanical overload of the blades and other constructional parts of the wind turbine. (The typical limit for restarting, as previously described, is at wind speed 20 m/s).

Figure 3:
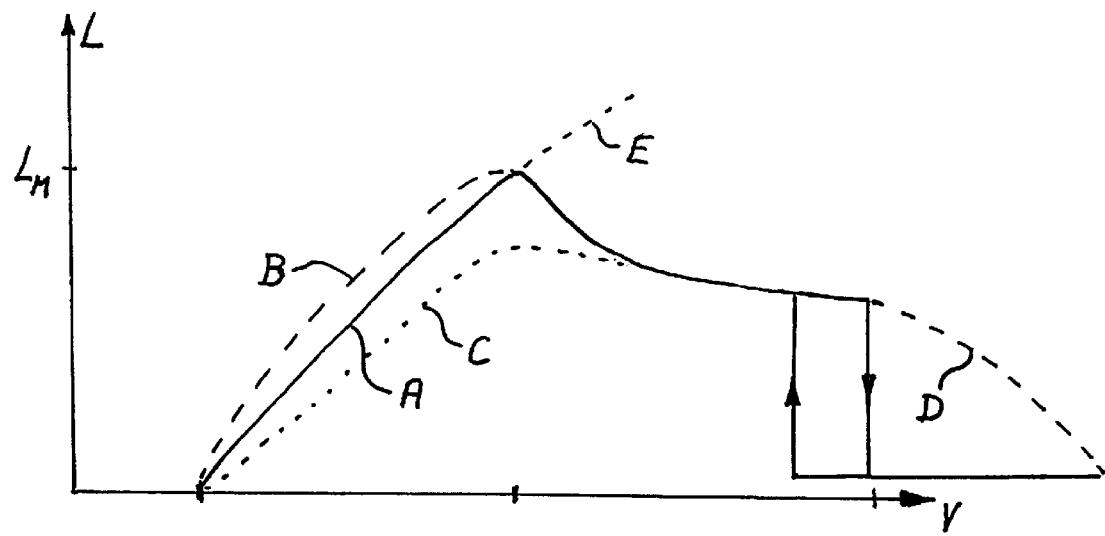

FIG. 3 shows the typical mechanical load on the blades of the rotor, i.e. the bending torque in a direction perpendicular to the rotor plane, and shows that the load is increasing with increasing wind speed until the point where nominal power is generated whereafter the blades are pitched out of the wind and the mechanical load is reduced correspondingly. If the wind turbine is producing energy close to the point where the pitching out of the wind is started, gusty wind conditions will provide a mechanical load which is higher than the maximum of the curve A, as indicated by the dotted line E.

The wind turbine may also be provided with mechanical load sensors detecting the driving torque of each blade. The measured driving torque for each individual blade will be the sum of the gravitational torque on each blade which is varying with the position of the blade during each rotation, i.e. a sinusoidal curve, and the wind torque on each blade, which is a function of the actual wind influencing the blade. The sinusoidal part of the torque curve for each blade can be used to calculate the angular position of the blade, and the wind dependent part of the torque on each blade may be used to detect error conditions in the wind turbine if the expected correspondence between wind speed and blade torque is not achieved. Such errors may be due to over-icing, dirt deposition on the blades, not correctly functioning pitch control, errors in different sensors in the control system, etc.

Statistical information on measured mechanical loads on the blades may be collected in order to obtain a basis for evaluating the site on which the wind turbine is positioned whereby control functions of the wind turbine may be optimized using this information or the information may be used for planning new wind turbines. Furthermore, such statistical information can be used for planning maintenance work on the wind turbine.

With the present invention, where the mechanical loads on the blades are measured, the control of the energy production of the wind turbine can be chosen, in accordance with the instant character of the wind and corresponding safety margins for the blades, to a more or less aggressive operation, as indicated by the curves B and C in FIG. 2. The resulting mechanical loads on the blades are as indicated in FIG. 2 by the curves B and C. Under stable and laminar wind conditions, it is possible to obtain a more aggressive control as indicated by the curve B, and under less favourable conditions with turbulence and varying wind velocities, it may be necessary to control the wind turbine in accordance with a substantially less aggressive curve as indicated by C in FIG. 2. In this way, the optimisation for a given wind turbine is obtained by the fact that the wind turbine will only have to be controlled in a less aggressive way in a limited part of the time, whereas it may be possible to control it in a more aggressive way most of the time.

A further possibility is to let the wind turbine produce energy at a reduced energy production at wind velocities above the usual maximum velocity $V_M$, as indicated by the curve D in FIG. 2. It is assumed that safe and optimized operation in this high-wind range will be possible when controlling the pitch of the blades in accordance with the measured mechanical loads on the blades.

What is claimed is:

1. A method of controlling (4) the operations of a wind turbine (1) comprising a rotor (2) with a number of blades mounted for rotation about a mainly horizontal axis (3), said method comprising
    a) controlling (4) the pitch of the blades of the wind turbine (1) in dependence on measured parameters in order to optimize the operation of the wind turbine (1) with respect to produced energy under varying weather and wind conditions, and
    b) measuring (7,8) mechanical loads on the blades, characterized by further comprising using the measured (7,8) mechanical loads to calculate the positions of the blade tips and adjusting the control (4) of the wind turbine (1) in order to maintain a certain safety distance between the blades and a tower (5).

2. A method in accordance with claim 1, characterized by further comprising
    controlling (4) the pitch of the blades of the wind turbine (1) in such a way that the measured mechanical loads are maintained below certain limits during operation.

3. A method in accordance with claim 1, characterized by comprising using the measured mechanical loads to deduce information on the character of the wind field and adapting the control of the wind turbine in dependence thereof.

4. A method in accordance with claim 1, characterized by further comprising controlling the pitch of the blades of the wind turbine individually in dependence on the measured mechanical loads of the blades.

5. A method in accordance with claim 1, characterized by further comprising using the measured mechanical loads to ensure safe operation of the wind turbine at reduced energy production at higher winds, where wind turbines would normally be stopped.

6. A method in accordance with claim 1, characterized by further comprising collecting statistical information on the measured mechanical loads on the blades.

7. A wind turbine, comprising
    a rotor with a number of blades mounted for rotation about a mainly horizontal axis,
    means for controlling the pitch of the blades in dependence on measured parameters,
    mechanical load sensors mounted to measure the mechanical loads on the blades and connected to influence the means for controlling the pitch of the blades, characterized by the mechanical load sensors being connected to a controller comprising means for calculating the positions of the blade tips and influencing the control of the individual blade pitch angles in order to maintain a certain safety distance between the blades and a tower.

8. A wind turbine (1) in accordance with claim 7, characterized by the controller (4) further comprising means for controlling (4) the pitch of the blades of the wind turbine (1) in such a way that the measured mechanical loads are maintained below certain limits during operation.

9. A wind turbine in accordance with claim 7, characterized by the controller further comprising means for deducing information on the character of the wind field and influencing the control of the wind turbine in dependence thereof.

* * * * *